United States Patent
Rau et al.

(10) Patent No.: US 7,926,164 B2
(45) Date of Patent: Apr. 19, 2011

(54) METHOD FOR PRODUCTION OF A STATOR AND STATOR PRODUCED ACCORDING THERETO

(75) Inventors: Eberhard Rau, Korntal-Muenchingen (DE); Thomas Berger, Ditzingen (DE); Martin Henne, Moeglingen (DE); Klaus Pflueger, Eberdingen (DE)

(73) Assignee: Robert Bosch GmbH, Stuttgart (DE)

( * ) Notice: Subject to any disclaimer, the term of this patent is extended or adjusted under 35 U.S.C. 154(b) by 825 days.

(21) Appl. No.: 10/530,228

(22) PCT Filed: Oct. 21, 2004

(86) PCT No.: PCT/DE2004/002222
§ 371 (c)(1), (2), (4) Date: Apr. 4, 2005

(87) PCT Pub. No.: WO2005/064765
PCT Pub. Date: Jul. 14, 2005

(65) Prior Publication Data
US 2006/0001328 A1  Jan. 5, 2006

(30) Foreign Application Priority Data
Dec. 30, 2003  (DE) .................................. 103 61 857

(51) Int. Cl.
*H02K 15/02* (2006.01)
*H02K 1/14* (2006.01)
*H02K 15/14* (2006.01)

(52) U.S. Cl. ............ 29/596; 310/216.004; 310/216.058; 310/216.091; 310/216.097

(58) Field of Classification Search .................. 310/216, 310/216.004, 216.058, 216.064, 216.074, 310/216.091, 216.097, 216.113; 29/596
See application file for complete search history.

(56) References Cited

U.S. PATENT DOCUMENTS

| | | | | |
|---|---|---|---|---|
| 558,539 | A * | 4/1896 | Waterhouse | 310/264 |
| 2,493,414 | A * | 1/1950 | Morrison | 164/106 |
| 2,845,555 | A * | 7/1958 | Carpenter et al. | 310/216 |
| RE26,788 | E * | 2/1970 | Hull | 310/217 |
| 3,831,268 | A * | 8/1974 | Boyd et al. | 29/598 |
| 3,958,325 | A | 5/1976 | Rick et al. | |
| 4,202,196 | A * | 5/1980 | Asai et al. | 72/137 |
| 4,206,621 | A * | 6/1980 | Kawasaki et al. | 72/130 |
| 4,901,428 | A | 2/1990 | King | |
| 4,940,913 | A * | 7/1990 | Fritzsche | 310/216 |
| 5,489,811 | A | 2/1996 | Kern et al. | |
| 5,992,003 | A * | 11/1999 | Elliott et al. | 29/596 |
| 6,262,511 | B1 * | 7/2001 | Ohashi et al. | 310/258 |

(Continued)

FOREIGN PATENT DOCUMENTS

DE  23 44 193  3/1975

(Continued)

*Primary Examiner* — Burton Mullins
(74) *Attorney, Agent, or Firm* — Michael J. Striker

(57) ABSTRACT

A method for manufacturing a stator core (20) for an electric machine, in which a plurality of strip-shaped laminations (21) are first stacked to form an essentially block-shaped lamellas packet (40) that is then shaped into an annular form by means of roller bending in one of the subsequent steps so that the outer teeth are provided on the outer circumference of the lamination packets and has an axial direction (a) that corresponds to a cylinder axis (z), the annular form having axial end surfaces (46), wherein in another of the subsequent steps, the annular lamination packet (40) is plastically deformed in the axial direction (a) only on the outer teeth (70) of the axial end surfaces (46).

19 Claims, 14 Drawing Sheets

U.S. PATENT DOCUMENTS

| | | | |
|---|---|---|---|
| 6,337,529 B1 * | 1/2002 | Higashino et al. | 310/254 |
| 6,346,758 B1 * | 2/2002 | Nakamura | 310/217 |
| 6,774,511 B2 * | 8/2004 | Chochoy et al. | 310/43 |
| 6,819,024 B1 * | 11/2004 | Fujita et al. | 310/216 |
| 6,979,930 B2 | 12/2005 | Harada et al. | |
| 7,518,271 B2 * | 4/2009 | Braun et al. | 310/62 |
| 2003/0020357 A1 * | 1/2003 | Harada et al. | 310/216 |
| 2003/0071534 A1 | 4/2003 | Kreuzer et al. | |
| 2005/0067911 A1 * | 3/2005 | Harrer et al. | 310/216 |
| 2005/0073211 A1 * | 4/2005 | Lee | 310/216 |

FOREIGN PATENT DOCUMENTS

| | | |
|---|---|---|
| DE | 101 02 658 | 7/2002 |
| DE | 101 02 658 A1 | 7/2002 |
| GB | 977 749 | 12/1964 |
| JP | 1-198253 | 8/1989 |
| JP | 2-36331 | 2/1990 |
| JP | 4-61115 | 2/1992 |
| JP | 2003-37951 | 2/2003 |
| WO | 01/54254 | 7/2001 |

* cited by examiner

Fig. 21a
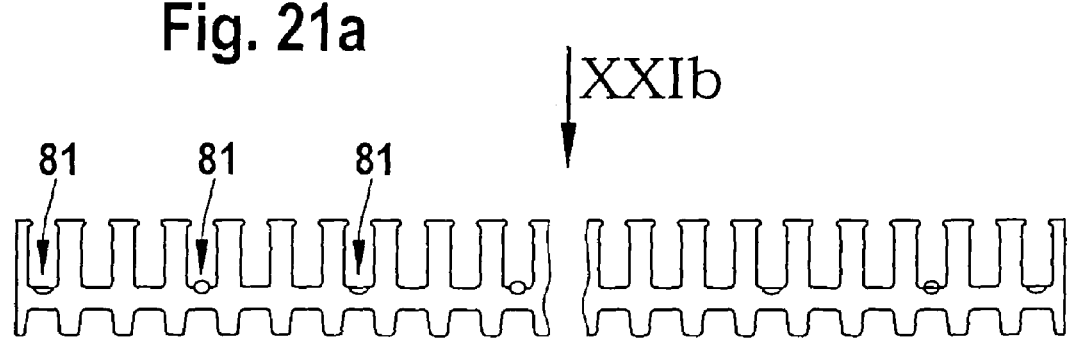
Fig. 21b
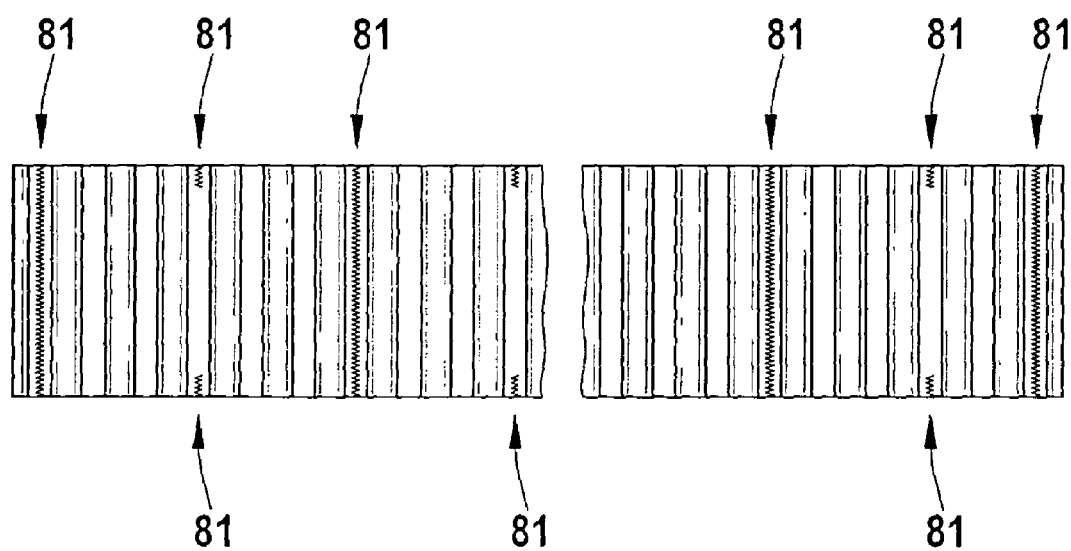
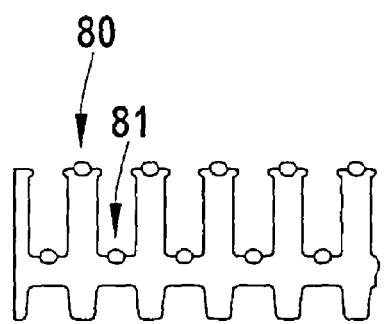
Fig. 22

METHOD FOR PRODUCTION OF A STATOR AND STATOR PRODUCED ACCORDING THERETO

CROSS-REFERENCE

The invention described and claimed hereinbelow is also described in German Patent Application DE 10 361 857.0 filed on Dec. 30, 2003. This German Patent Application, whose subject matter is incorporated here by reference, provides the basis for a claim of priority of invention under 35 U.S.C. 119(a)-(d).

BACKGROUND OF THE INVENTION

The invention relates to a method for manufacturing a stator and stator manufactured according to said method.

WO 01/54254 A1 has disclosed a method for manufacturing a stator that is provided for an electric machine, in particular for a generator used in motor vehicles. In it, strip-shaped lamellas are first stacked to form an essentially block-shaped lamination packet that is then shaped into an annular form by means of roller bending in one of the subsequent steps. The annular form of this stator or stator yoke has two axial end surfaces. It has been determined that such stators or stator yokes that are axially clamped by the axial end surfaces have a relatively high axial elasticity and flexibility. This flexibility can mean that detachable fasteners, e.g. screws used to clamp the stator between the end covers, will loosen or alternatively must be able to withstand very high loads, which affects their size. Since these screws are situated on the outer circumference of the stator, this can end up increasing the outer diameter of the electric machine.

SUMMARY OF THE INVENTION

The method according to the present invention for manufacturing a stator for an electric machine has the advantage that because the annular lamination packet is plastically deformed in the axial direction at least in some parts of the axial end surfaces, its flexibility, particularly in the context of being screwed between two end covers, is significantly reduced, thus improving the attachment between two end covers. This significantly reduces the danger of the fasteners between the two end covers coming loose. In addition, this prevents to the greatest extent possible the electromagnetically effective inner teeth of the stator from fanning out due to clamping between the two end covers. As a result, this also reduces electromagnetic losses.

It is particularly advantageous for axial clamping surfaces to be formed onto the two axial ends of the annular lamination packet as a result of the plastic deformation. This means that the plastic deformation in the axial direction reduces the subsequent elastic component of the deformation of the stator in the axial direction. This reduces the elasticity between the two end covers. The remaining compressibility of the stator is now more homogeneous so that the stresses between the individual fastening elements between the two end covers are now considerably less divergent from one another. Particularly when manufacturing the axial clamping surfaces by means of a cold shaping process, in addition to the intentional plastic deformation, the axially exerted shaping forces also achieve an increase in the axial rigidity. This has an advantageous impact in stators installed with the axial clamping technique, which are subjected to a high pressure load in the installed state and, due to their laminated packet construction, have a seating behavior that is intrinsically unfavorable for the screw connection of the housing. This exertion of force on the finished, hollow cylindrical stator after the roller bending process sharply reduces the variation that is an inherent part of the remaining deformation. It is therefore also possible to establish even tighter tolerances for the dimensions and shape of the stator and therefore to fulfill even more exacting requirements.

According to another embodiment of the invention, at the same time as the axial deformation, the annular lamination packet is pressed in the radial direction on its outer circumference and is thus likewise plastically deformed. This measure prevents any excessive changes in the radial direction from occurring due to the axial exertion of force; the outer form of the stator yoke or stator is more precise and can thus be maintained more easily.

In particular, the plastic deformation of the outer circumference of the lamination packet produces a radial housing fitting. In the so-called axial clamping technique used in motor vehicle generators and in electric machines in general, it is necessary to achieve not only a secure axial position of the stator relation to the end covers, but also a precise central positioning in relation to the rotor inside the stator. As a result of the measure taken according to the present invention, when the housing fitting is formed onto the packet, this provides a centering diameter, which permits an extremely exact positioning of the stator between the end covers and likewise permits an extremely exact alignment in relation to the rotor. In addition, this makes it possible to produce a perfect perpendicular relationship between the axial clamping surfaces and the centering diameter and/or the housing fitting. It is also possible, through simultaneous plastic deformation in the axial and radial direction, to produce an insertion chamfer between the axial clamping surfaces and the housing fitting. This insertion chamfer according to the present invention thus eliminates the need for an additional, e.g. material-removing, work step and permits an easy, reliable installation of the stator into an end cover.

The selected cold shaping method eliminates, for example, expensive material-removing machining processes; the elimination of the material-removing finishing also prevents burrs from being produced, thus eliminating the accompanying installation problems.

According to the present invention, the laminations should have a thickness of between 0.35 mm and 1 mm; a thickness of 0.5 mm is preferred and the laminations preferably have the same thickness. This has the advantage of high production output and efficiency because the lamination thickness consequently lies in a range that can already be produced in the so-called electric sheet grade. In addition, the complexity of tools is reduced and the productivity of the production unit is increased. The homogeneous construction (uniform thickness) improves the bending properties of the stator yoke.

In addition, the number of n lamellas of a laminated stator core are positioned in its packet in the same sequence in which they were produced in a stamping die. This has the advantage that on the one hand, lamellas with practically identical material thicknesses can be used and consequently, the foreseeable packet tolerances for the laminated stator core are as low as possible. Cutting and positioning errors of the die guiding plate or cutting plate during the stamping as well as positioning errors of the sheet metal strip can thus be kept to a minimum in the stamping die and thus also in the end product, i.e. the laminated stator core.

Before the lamellas are stamped out from a lamination sheet blank, for example coming from a band spool, a measuring device determines its material thickness, and the desired number of lamellas in the essentially block-shaped lamination packet is determined based on a toleranced desired width of the essentially block-shaped lamination packet. A computer determines the precise number of lamellas for a laminated stator core. This measure results in low packet width tolerances.

Another measure for manufacturing or maintaining lower axial tolerances and lamination packet width tolerances is comprised of first cleaning the individual lamellas, thus eliminating residual oil and contamination stemming from the stamping process. Then, these cleaned lamellas are stacked to produce a gap-free lamination packet, are precisely aligned, and are pressed against one another through exertion of a force in order to then be attached to one another by means of an attaching technique, for example welding. So-called laser beam welding is particularly suitable for this since it produces a distortion-free lamination packet with the least possible heat input.

The lamination packet is prestressed axially during the roller bending. This prevents impermissible plastic deformations, for example fanning out and waving of the laminations.

According to another advantageous embodiment of the invention, after the essentially block-shaped lamination packet undergoes the roller bending process with axial prestressing, the ends of the lamination packet that are oriented toward each other are then attached to each other. This attaching process is also preferably executed by means of a laser welding method.

The axial shaping step reduces the axial length of the stator packet by between 1% and 10% at the outer circumference.

To further improve the axial rigidity of the stator packet or lamination packet, before the roller bending of the initially strip-shaped lamination packet, a winding is inserted into the grooves of the lamination packet. The inevitable friction between the winding and grooves, imparted via wire enamel and groove insulation, yields an additionally improved axial rigidity.

One dependent claim provides a stator for an electric machine, whose stator yoke is comprised of a roller-bent, essentially block-shaped lamination packet, which has axial end surfaces and is plastically deformed in the axial direction on these end surfaces. This plastic deformation can be limited to local areas so that the lamination packet is deformed at least in some parts on the outer circumference of the axial end surfaces. If the lamination packet has outer teeth, then these deformed parts can be limited to the outer teeth.

The stator yoke should have at least one radial, plastically shaped stator fitting on its circumference to permit a precisely fitting insertion into an end plate. This fitting is located on at least one axial end of the stator yoke.

In addition, the stator has at least one shaped insertion chamfer. The stator yoke has a greater axial length at its inner diameter than at its outer diameter. In the context of the present invention, this lends the stator yoke a greater axial rigidity.

BRIEF DESCRIPTION OF THE DRAWINGS

The drawings depict exemplary embodiments of a method according to the present invention for manufacturing a stator and of a stator according to the present invention.

FIGS. 16 to 23 show various exemplary embodiments for welding seams on the lamination packet.

DESCRIPTION OF THE PREFERRED EMBODIMENTS

Figure 1A:
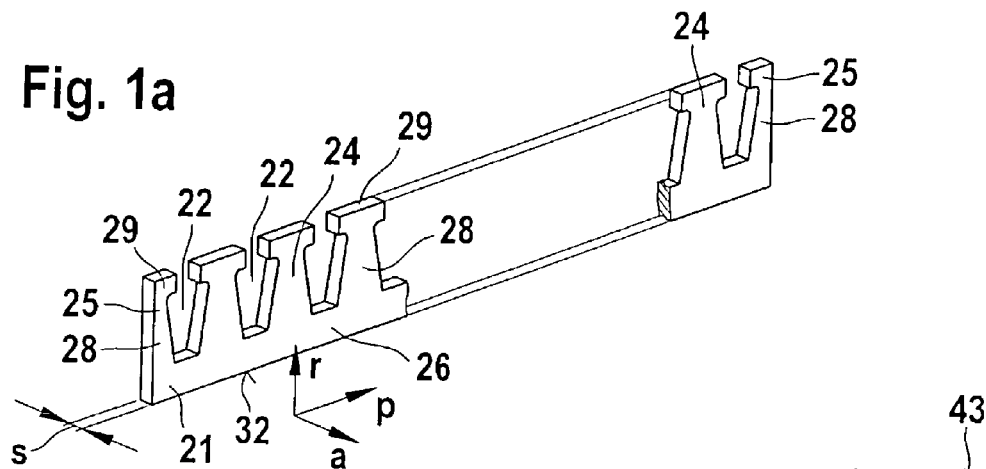
FIGS. 1a, 1b, 1c show the basic manufacturing method of a stator core manufactured according to the so-called flat packet manufacturing method.
Figure 1B:
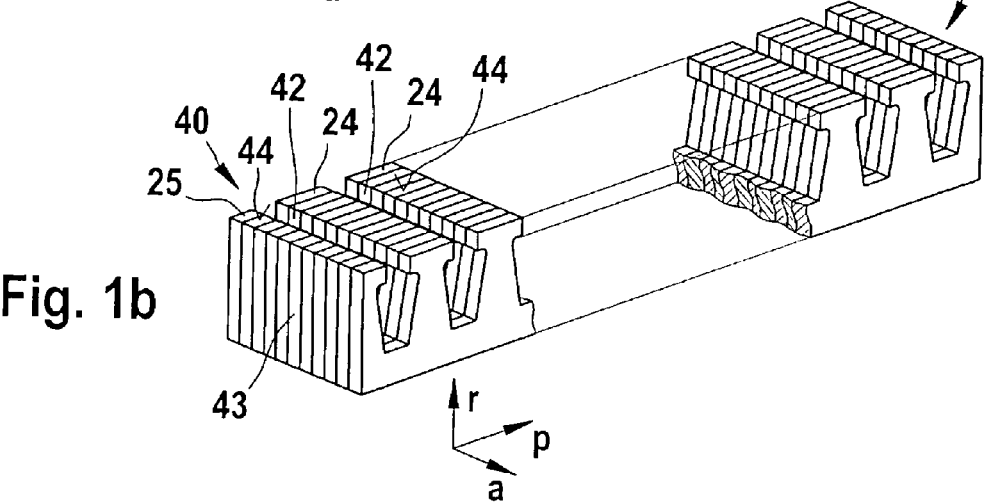
Figure 1C:
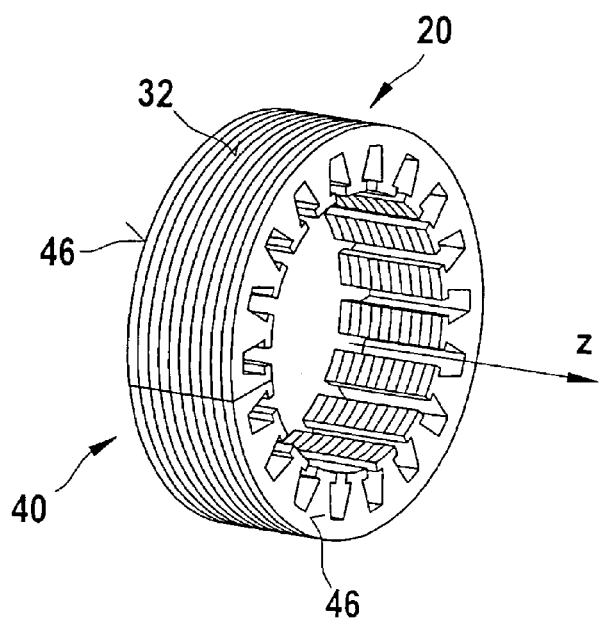

FIGS. 1a, 1b, and 1c show the basic manufacturing method of an electric machine stator core 20 manufactured using the so-called flat packet manufacturing method. First, essentially rectangular or block-shaped strip-shaped lamellas 21 are produced, which are provided with groove slots 22. The groove slots 22 are delimited on both sides by a respective tooth 24 or half tooth 25. The teeth 24 and half teeth 25 are connected to one another by means of a yoke 26. The yoke 26 extends essentially in the circumference direction p and the radial direction r and also generally has a material thickness s that coincides with a material thickness of the lamellas 21. The yoke 26 has a yoke rear surface 32 oriented away from the teeth 24 and 25. This yoke rear surface 32 is oriented in the negative direction r. The teeth 24 and half teeth 25 extend essentially in the radial direction r and the circumference direction p. The teeth 24 and 25 also have the material thickness s. Like the teeth 24 and 25, the groove slots 22 naturally also extend in the circumference direction p and the radial direction r. The teeth 24 and half teeth 25 can each be subdivided into a tooth base 28 and a tooth head 29, which is widened in the circumference direction p in relation to the tooth base 28. The tooth base 28 joins the teeth 24 and 25 to the yoke 26 in an integral fashion and the tooth bases 28 protrude from the yoke 26 essentially perpendicular to it. The half teeth 25 are respectively located at each end of the yoke 26 and thus in the initial state of the lamellas 21, are situated at opposite ends in the circumference direction p. A lamellas 21 of this kind can, for example, have 36 groove slots 22 or even for example 48 groove slots 22. Higher numbers of groove slots are also possible. A lamellas 21 of this kind is usually comprised of a so-called electric sheet and is therefore ferromagnetic.

A large number of such lamellas 21, for example 60 lamellas 21 are stacked against one another to form an essentially block-shaped lamination packet 40. The lamellas 21 are aligned so that their outer contours comprised of the yoke 26 and the teeth 24 and 25 coincide with one another. The lamination packet 40 has an end 43 at each of its ends in the circumference direction p. The lamination packet 40 thus formed consequently also extends in the axial direction a, the circumference direction p, and also the radial direction r. Consequently, this lamination packet 40 then has grooves 42 extending in the axial direction a, which are in turn delimited by the teeth 24 and half teeth 25. The teeth 24 and half teeth 25 constitute individual surfaces that are oriented in the radial direction r. These tooth surfaces 44 later constitute the surfaces that directly cooperate with the electromagnetically effective parts of a rotor. In one of the subsequent steps, this lamination packet 40 is converted into an annular shape by means of roller bending. As a result of this shaping, after the roller bending, the tooth surfaces 44 are all aligned so that they are oriented toward a cylinder axis z that corresponds to the axial direction a. The tooth surfaces 44 thus constitute part of a cylinder circumference surface that can be inscribed into the annular form of the lamination packet 40, also see FIG. 1c. As a result of this roller bending, the two half teeth 25 come into contact with each other and thus together, constitute a whole tooth 24 from an electromagnetic standpoint. This annular shape of the lamination packet 40 has two axial end surfaces 46, only one of which is visible in FIG. 1c. As will be explained below, in another of the subsequent steps, the annular lamination packet 40 is plastically deformed in the axial direction a, at least in some places on the axial end surfaces 46.

Figure 2:
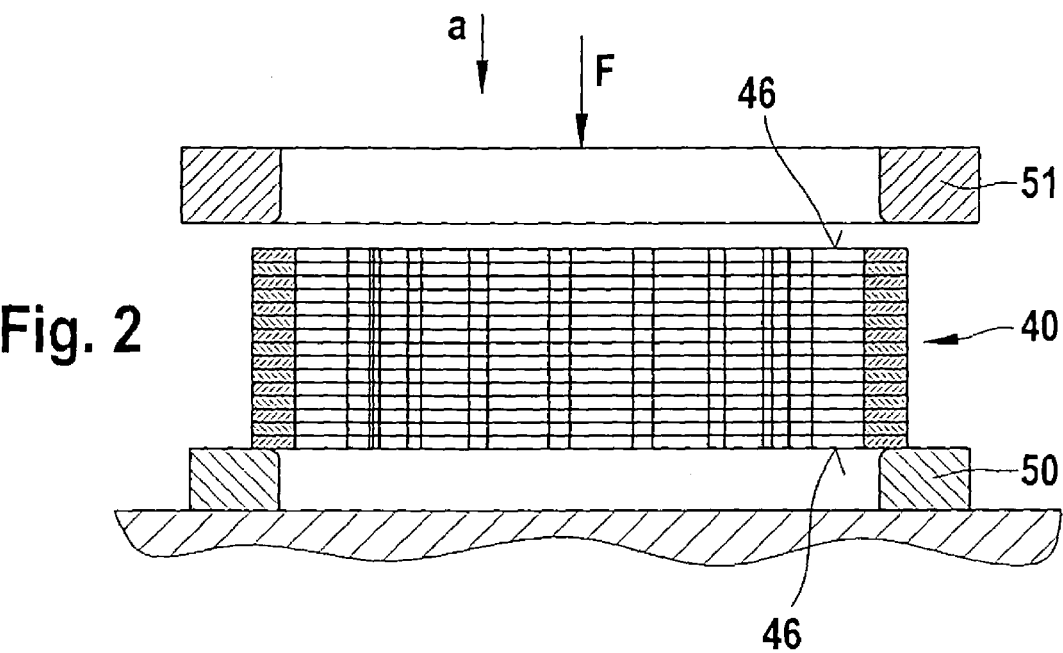
FIG. 2 shows how the annular lamination packet is plastically deformed in the axial direction at the axial end surfaces.

FIG. 2 shows how the annular lamination packet 40 is plastically deformed in the axial direction at the axial end surfaces 46. To execute this process step, the round lamination packet 40 and/or stator core 20 is placed with one axial end surface 46 onto a ring 50 whose inner diameter is smaller than the outer diameter of the lamination packet 40. From the opposite axial end surface 46, a second ring 51 is moved toward this axial end surface 48 until it rests against the second axial end surface 46. The inner diameter of this ring 51 is also smaller than the outer diameter of the rolled lamination packet 40. The ring 51 is then subjected to a force and presses against the annular lamination packet 40 so that due to the "action equals reaction" principle, the annular lamination packet 40 rests against the ring 50 with a corresponding opposite force. This exertion of the force F plastically deforms the annular lamination packet 40 in the axial direction a at the axial end surfaces 46. Depending on whether the rings 50 and/or 51 rest against the end surfaces 46 with their entire annular shape or only part of it, the lamination packet 40 is deformed in the axial direction either over its entire circumference or only in portions thereof or individual places on the circumference.

Figure 3:
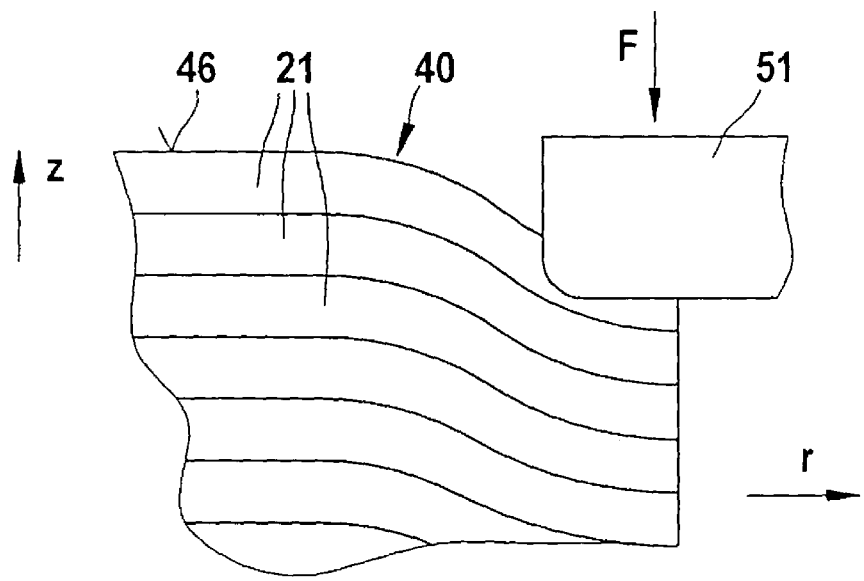
FIG. 3 shows a detail of the change in the lamination packet during the axial shaping process.

FIG. 3 shows a detail of the change in the lamination packet 40 during the shaping process by means of the ring 51 and the ring 50. In a significantly enlarged depiction, a detail at the upper right corner of the lamination packet 40 depicted in FIG. 2 is shown at the moment the ring 51 reaches its deepest penetration. As is clear from the drawing, the individual lamellas 21 are plastically deformed at their radially outer ends by the rounded contour of the ring 51, which is preferably rounded in the radially inward direction. The material of the lamellas 21 is thus compressed in the axial direction and in this instance, a lamination packet 40 is produced that bulges outward slightly.

Figure 4:
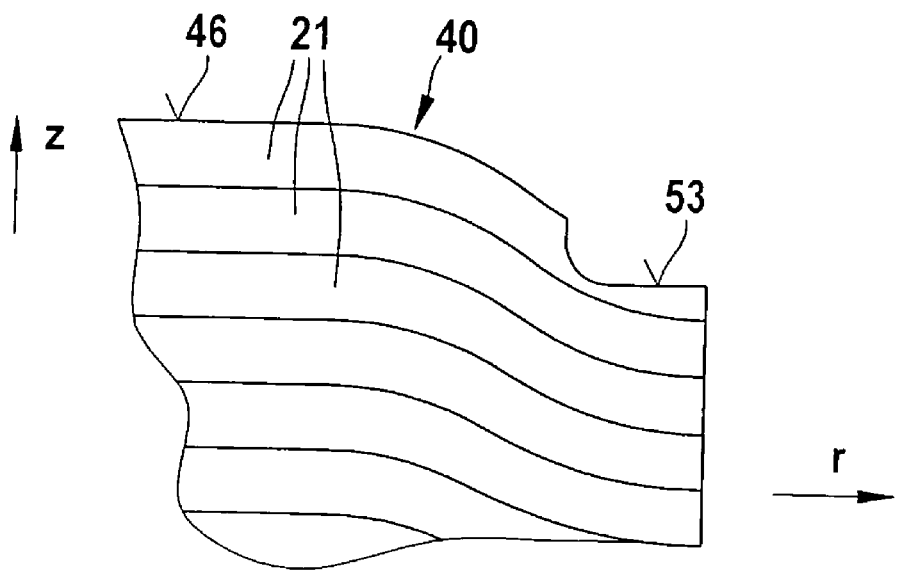
FIG. 4 shows the change in the lamination packet after the shaping process.

FIG. 4 shows the same detail of the lamination packet 40 from FIG. 3, without the ring 51, after it has been lifted away. The plastic deformation of the end surfaces 46 produces axial clamping surfaces 53 at the two axial ends of the annular lamination packet 40.

Figure 5:
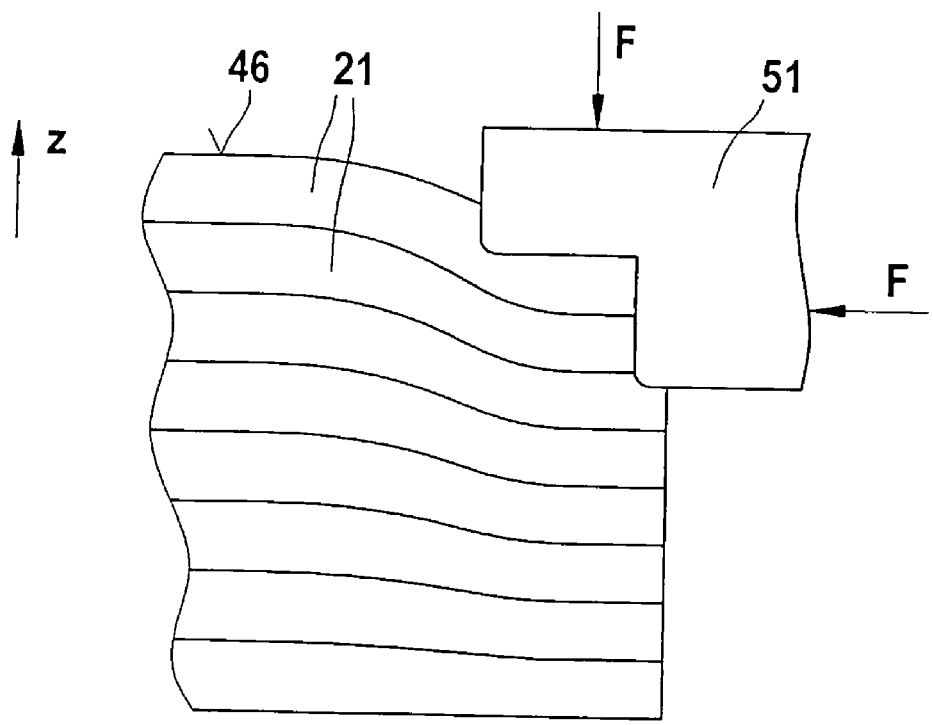
FIG. 5 shows a detail of the change in the lamination packet during the axial and radial shaping process.

FIG. 5 shows another exemplary embodiment for the plastic deformation of the end surfaces 46. Whereas the ring 51 according to the exemplary embodiment in FIGS. 3 and 4 has an essentially square profile, the ring 51 shown in FIG. 5 has a slightly different contour. The ring 51 is embodied so that it is in fact suited for plastically forming axial clamping surfaces onto the lamination packet 40 in the axial direction, but this ring 51 is also in a position to simultaneously press against the circumference of the lamination packet 40 in the radial direction and thus to deform it plastically.

Figure 6:
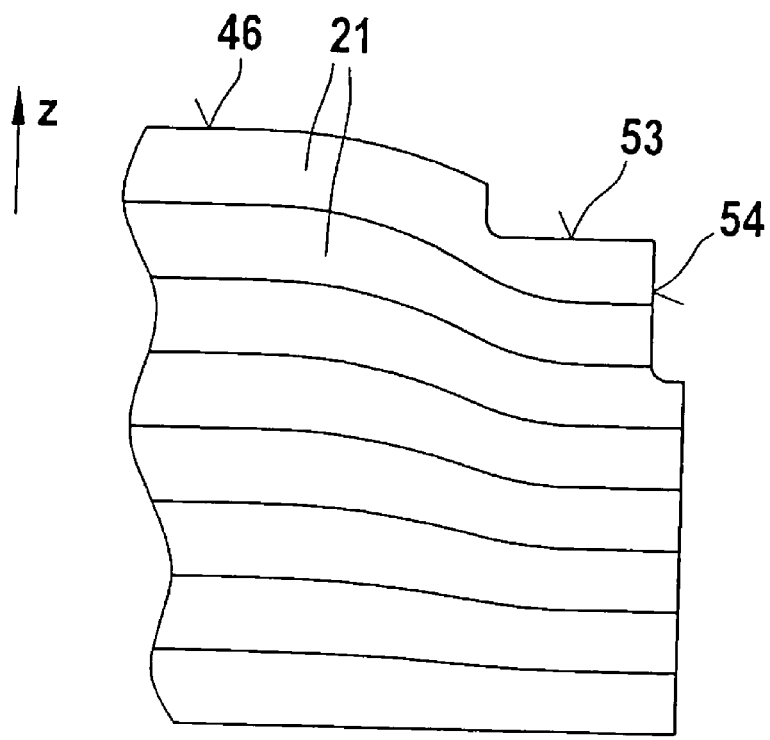
FIG. 6 shows the change in the lamination packet after the axial and radial shaping process.

FIG. 6 shows the corresponding contour of the lamination packet 40 after the ring 51 has been lifted away. In this instance, the plastic deformation of the circumference of the lamination packet 40 produces a housing fitting so that after the ring 51 is lifted away, as before, an axial clamping surface 53 remains, now also accompanied by a radial housing fitting 54. The diameter of the housing fitting is between 0.01% and 1% smaller than the initial dimension.

Figure 7:
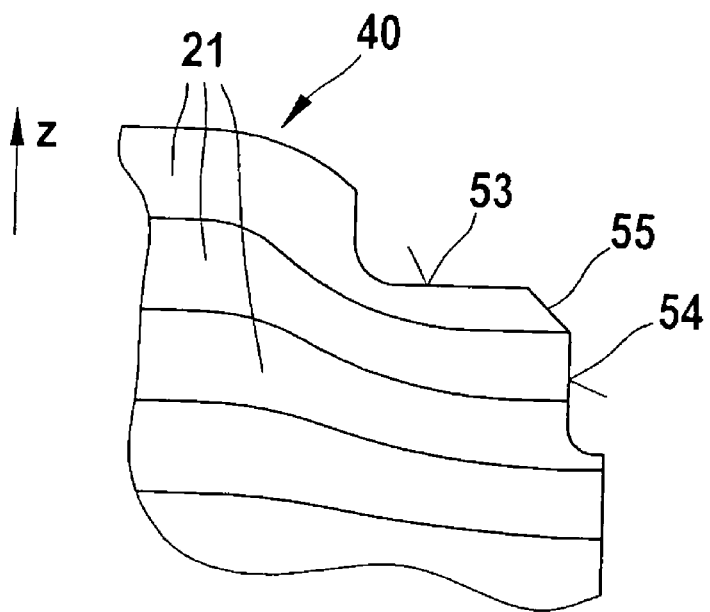
FIG. 7 shows the change in the lamination packet after the axial and radial shaping process, with an insertion chamfer molded onto it.

FIG. 7 shows another variant of this plastic deformation of the lamination packet 40. In this exemplary embodiment, not only are an axial clamping surface 53 and a housing fitting 54 provided, but also an insertion chamfer 55 produced by the same plastic deforming process.

Figure 8:
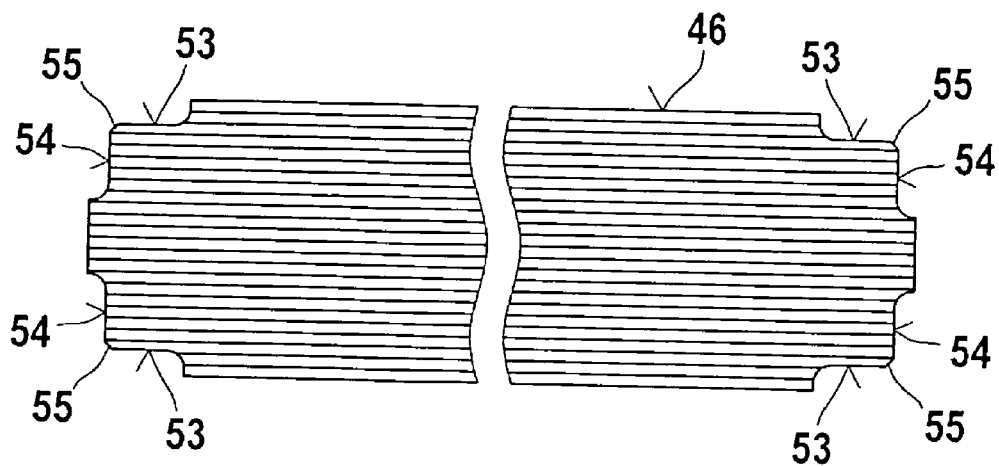
FIG. 8 shows a side view of the lamination packet after the axial and radial shaping process, with an insertion chamfer molded onto it.

FIG. 8 shows the side view of a rolled lamination packet 40 after the axial end surfaces 46 and the outer circumference have been plastically deformed. It should be noted at this point that the deformations adjoin the corners at which the axial end surface 46 meets the outer circumference surface. Both the axial clamping surface 53 and a housing fitting 54 extend for a length of approximately 1 to 6 mm.

In order to achieve a particularly dimensionally precise axial length of the lamination packet 40 after the plastic deformation in the axial direction, particular measures must be taken:

First, it is necessary for the lamellas to have a thickness of between 0.35 mm and 1 mm; a thickness of 0.5 mm is preferable. Ideally, all of the lamellas have the same material thickness.

Figure 9:
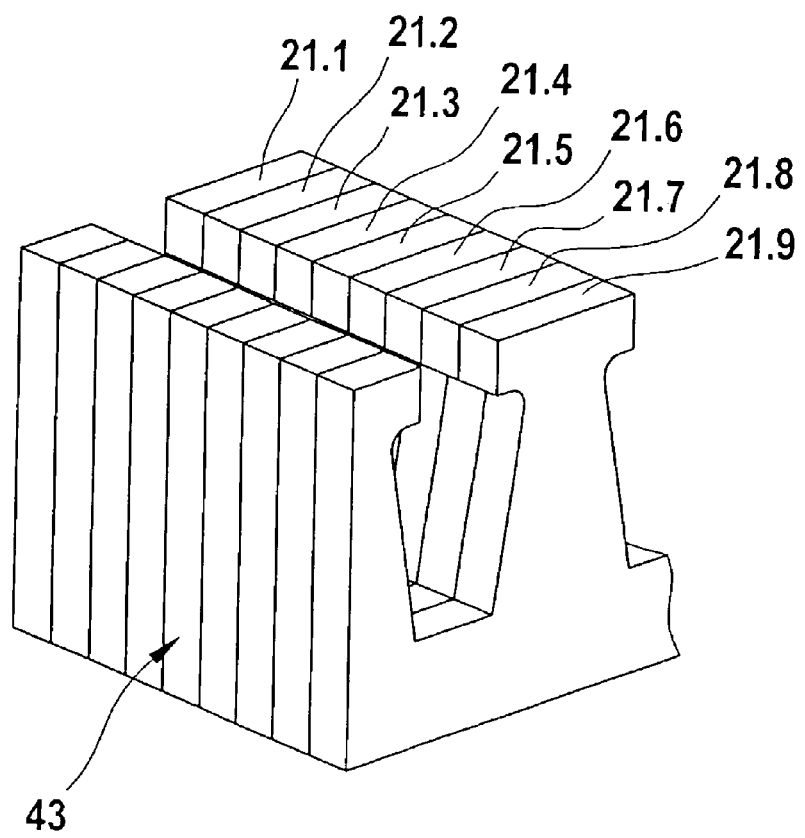
FIG. 9 shows lamellas arranged in the stamping sequence.

In order to produce a lamination packet 40 that has particularly favorable properties with regard to expected tolerances, even the stamping of the lamellas 21 is carried out in a particular way. During stamping, the lamellas 21 are ejected from the stamping machine in the same sequence in which they came from a machine or a stamping die. For example, a first lamellas 21.1 is stamped out, followed immediately by a second lamination 21.2, then a lamellas 21.3, followed by a lamination 21.4, and then the succeeding lamellas 21.5, 21.6, 21.7, 21.8, and 21.9 in turn. In this example, therefore, nine lamellas 21.1 through 21.9 are stamped directly in sequence. Precisely this sequence should also be maintained during the packeting of the lamination packet 40, also see FIG. 9. The above-mentioned sequence of lamellas 21 is maintained in the manufacture of the lamination packet 40 in this example as well. Consequently, the first lamellas 21.1 of the lamination packet 40 to be produced is followed directly by the lamellas 21.2, which is followed by the lamellas 21.3, which in turn is followed by the lamination 21.4, etc. lamellas 21.9 is put in place, which finally yields a lamination packet 40 with the desired sequence. If the lamination packet has, for example, n=60, 70, or 80 lamellas 21, then the lamellas 21.1 through 21.60, 21.1 through 21.70, or 21.1 through 21.80 are placed against one another in the above-described manner and packeted to form a lamination packet 40. The number of n lamellas 21 of a laminated stator core 40 are consequently arranged in its packet in the same sequence in which they were produced in a stamping die.

The above-described measure according to which, for example, precisely n=60, 70, or 80 lamellas 21 are to be packeted to form a lamellas packet 40 is particularly effective if the tolerances of the material thicknesses s of the individual lamellas 21 lie within a predetermined, very precise range.

A further measure for improving the axial tolerances of the lamination packet 40 will be described below. Usually, the lamellas 21 are stamped out of sheet metal. These metal sheets often have the property that their material thickness varies transverse to the rolling direction. Usually, the material thickness increases or decreases transverse to the rolling direction so that the sheet has a trapezoidal cross section. If the lamellas 21 are then stamped out transverse to the rolling direction so that the yoke 26 extends transverse to the rolling direction, then the lamination 21 has a material thickness that slightly increases, for example, in the yoke direction or circumference direction p. If these lamellas 21 are packeted as described above in the corresponding stamping sequence—ten lamellas 21 in the example according to FIG. 10, then this yields a lamination packet 40 that is two different widths, $B_{43.1} < B_{43.2}$ in the axial direction a at its two opposite ends 43. As a result, the lamination packet 40 is basically trapezoidal when the teeth are viewed from above. The axial end surfaces 46 of a round stator core 20 made of such a lamination packet 40 would thus rest unevenly against corresponding counterpart surfaces of the housing. In particular, a step would be formed at the ends 43 resting against each other so that fasteners to the right and left of the ends 43 would be subjected to widely divergent tensions and loads.

Figure 10:
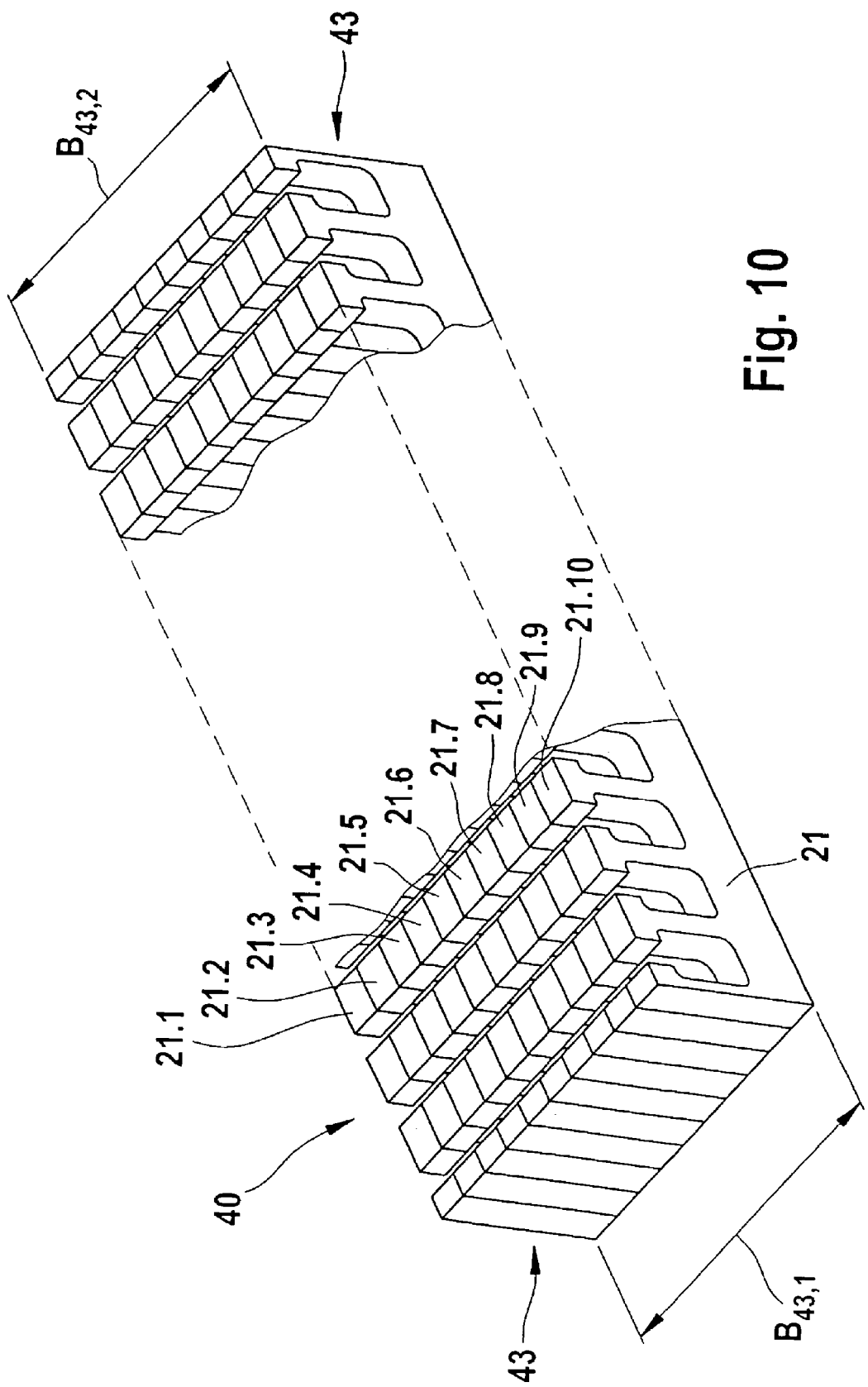
FIG. 10 shows a three-dimensional view of a lamination packet.
Figure 11:
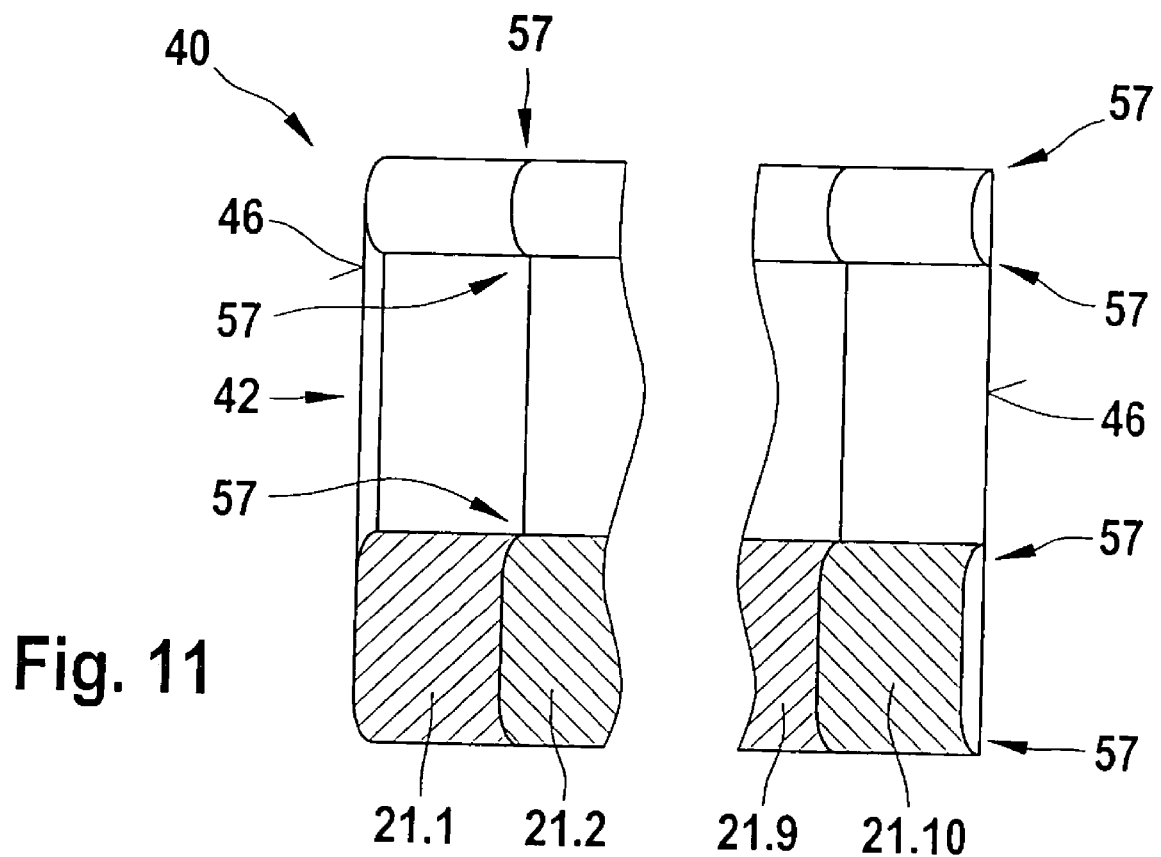
FIG. 11 shows a cross section through a groove of a lamination packet.

FIG. 11 shows a section through one of the grooves 42 of the lamination packet 40 from FIG. 10. Like the previously described lamination packets 40 and each of the individual lamellas 21, the contours of this lamination packet 40 have a so-called stamping burr 57. On the left end surface 46 in the drawing, the stamping burrs 57 point toward the axial middle of the packet; at the opposite end surface 46 on the right, the stamping burrs 57 point outward away from the lamination packet 40. As a result, misalignments among the individual lamellas 21 are minimized during packeting (form-fitting engagement between laminations).

Figure 12:
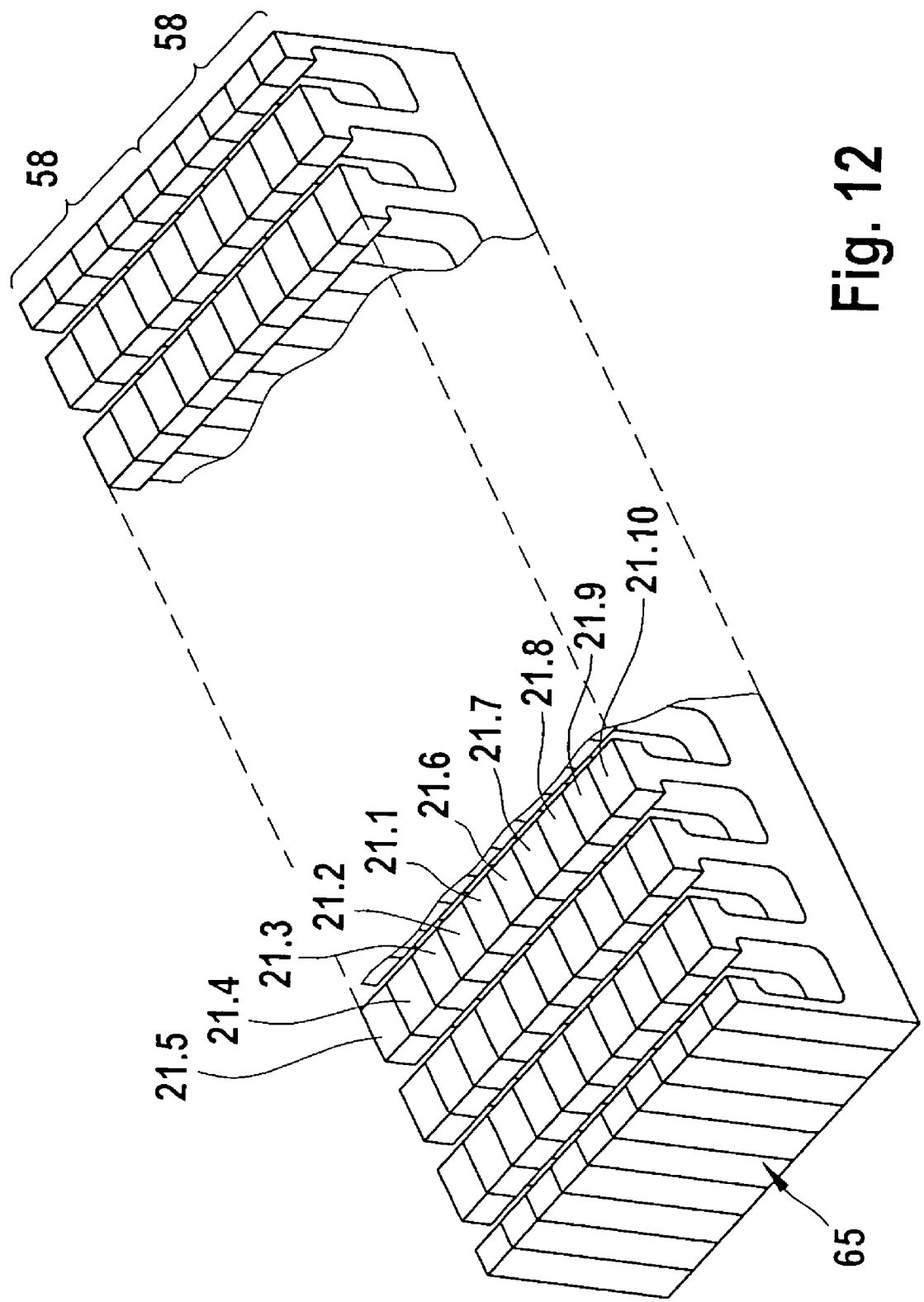
FIG. 12 shows a three-dimensional view of another exemplary embodiment of a lamination packet.
Figure 13:
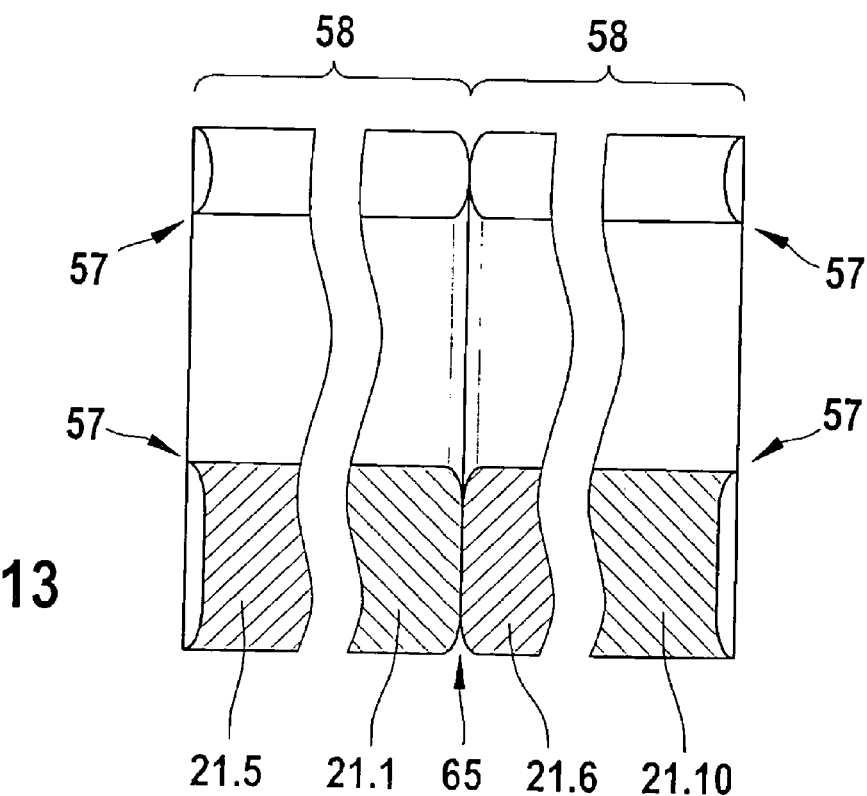
FIG. 13 shows a cross section through a groove of the lamination packet depicted in FIG. 12.

In order to avoid the aforementioned trapezoidal shape to the greatest extent possible, the lamination packet 40 shown in FIG. 10 is divided into two partial lamination packets 58 and these two partial lamination packets 58 are joined to form a lamination packet 40 in which the stamping burrs 57 of lamellas 21 adjacent to an internal junction point 65 are oriented away from each other, also see FIGS. 12 and 13. The material thicknesses of the lamellas 21 that vary in the direction of the yoke 26 can thus be compensated for over the length of the yoke 26 so that the widths $B_{43}$ at the ends 43 are virtually the same or even identical. To largely prevent internal elasticities in the axial direction a, the stamping burrs 57 are placed so that they do not rest against each other at the inner junction point. Such a placement would also make it harder to assure the precision of the positioning of the two partial lamination packets 58 since the burrs resting against each other would prevent each other from sliding.

In an intermediate step, it is possible to fix the partial lamination packets 58 internally by means of an attachment producing method, e.g. by means of welding seams or the other methods mentioned below, before they are joined to form a lamination packet 40.

In a lamination packet 40 constructed in this way, the stamping burrs 57 thus point away from the lamination packet 40 at the axial end surfaces 46.

Figure 14:
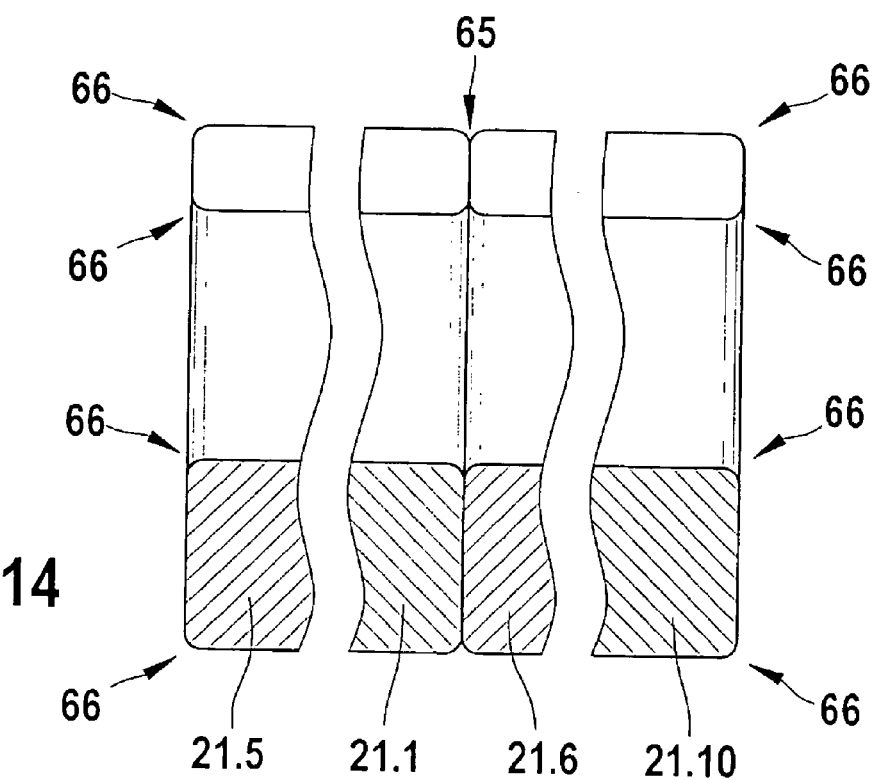
FIG. 14 shows a cross section through a groove of the lamination packet depicted in FIG. 12, after the removal of stamping burrs.

Another measure for improving the axial tolerances or width tolerances of the lamination packet 40 is comprised in removing the axially outward-pointing stamping burrs 57 of the lamellas 21. Suitable methods for this include cutting or non-cutting methods, thermal burr removal, and laser burr removal. It is particularly advantageous to form a rounded contour 66, for example a radius, onto the groove contours at the two axial end surfaces 46 of the lamination packet 40, also see FIG. 14.

But since particularly strict tolerance requirements with regard to lamellas thicknesses incur particularly high raw material costs for the lamellas 21, it is also possible to provide an additional measure to achieve a sufficient tolerance in the widths of the lamination packet 40 without simultaneously incurring excessively high costs due to extremely strict requirements with regard to material thicknesses s or their tolerances. Before the stamping of the lamellas 21 from a sheet metal lamination blank, a measuring device M determines its material thickness s and the desired number of lamellas 21 in the essentially block-shaped lamination packet 40 is determined based on a toleranced desired width of the essentially block-shaped lamination packet 40. This measure makes it relatively easy to react to fluctuations in the tolerance position in the material thicknesses s of the lamellas-21. Therefore, whereas the lamination packet 40 is ideally provided, for example, with 60 lamellas 21, is possible that due to fluctuations in the material thickness s resulting in relatively thick lamellas 21, instead of 60 lamellas 21 comprising a lamination packet 40, only 59 laminations will be used. By contrast, if the individual lamellas 21 have a relatively thin material thickness s, then the individual lamination packet 40 can also contain 61 lamellas 21, for example. This applies analogously to lamination packets that ideally contain 70 or 80 lamellas 21, but can instead either contain 69 or 71 lamellas 21 or contain 79 or 81 lamellas 21.

Another measure for achieving a lamination packet 40 that is as rigid and therefore inelastic as possible in the axial direction, is comprised in first, cleaning the still individual lamellas 21 to eliminate the presence of axial flexibility-enhancing materials or particles to the greatest extent possible between the lamellas 21, then stacking the desired number of lamellas 21 to form a gap-free, essentially block-shaped lamination packet 40, precisely aligning this lamination packet 40, which means that the contours of the lamellas 21 are as precisely congruent as possible, then pressing the lamellas 21 against one another through the exertion of a force in the axial direction with regard to the lamination packet 40, i.e. in the width direction of the lamination packet 40 (direction of the material thickness s), and then attaching the lamellas 21 to one another by means of an attaching technique. For example, this can occur by means of welding, in particular laser beam welding. This attaching method produces a coherent lamination packet 40.

Other suitable methods for attaching the lamellas 21 include, for example, clinching and toxing, which are both so-called double-bending joining methods, as well as stamp-packeting and stamp-laser-packeting.

The essentially block-shaped lamination packet 40 thus produced is subsequently roller bent with an axial prestressing of the lamination packet 40. Axial prestressing is understood here to mean that the lamination packet 40 is pressed in the direction of the material thickness s.

After the roller bending of the essentially block-shaped lamination packet 40, the two previously mentioned ends 43 face each other directly and essentially rest against each other. In this already annular state of the lamination packet 40, the two ends 43 are attached to each other while being prestressed, i.e. in the direction of the material thickness s of the lamination packet 40. These two ends 40 are attached to each other by means of a welding seam, in particular a laser welding seam. For example, this seam extends in the axial direction on the outer circumference of the lamination packet 40.

After the axial shaping step, the rolled lamination packet 40 must fulfill an additional requirement. Whereas the rolled lamination packet 40 in principle has an axial length of 100% before the axial shaping step, this axial length of the lamination packet 40 decreases at the outer circumference of the annular lamination packet 40 as a result of the axial shaping step. In this instance, the axial shaping step reduces the axial length by between 1% and 10% at the outer circumference of the annular lamination packet 40.

Another measure for improving the axial rigidity of the lamination packet 40 is comprised of inserting a stator winding into the grooves 42 of the lamination packet 40 before the roller bending of the essentially block-shaped lamination packet 40. The improved axial rigidity of the lamination packet 40 or stator core 20 is, in this instance, due to the presence of friction in the axial direction between the stator winding 60 and the grooves 42, which thus increases the axial rigidity of the stator core 20.

Figure 15A:
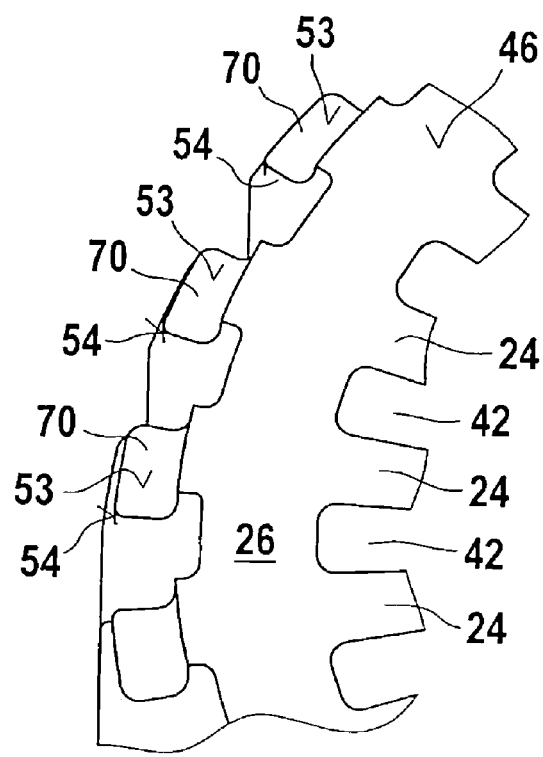
FIG. 15a shows axial clamping surfaces only on outer teeth of a lamination packet.
Figure 15B:
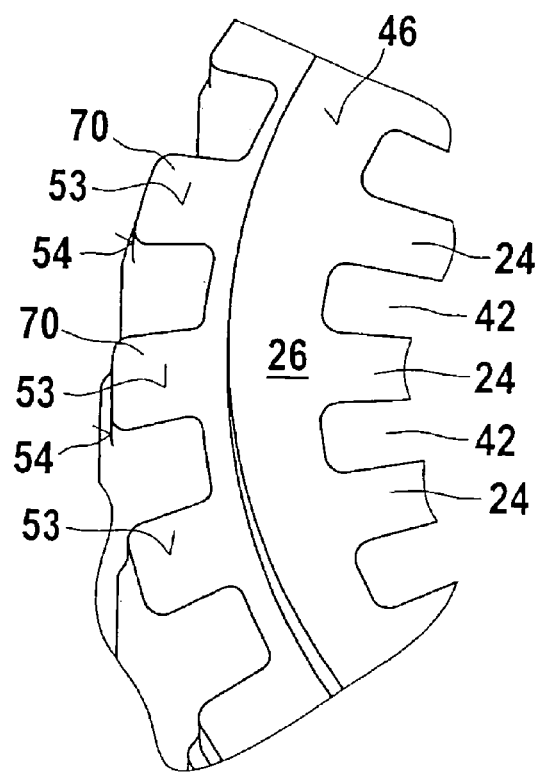
FIG. 15b shows axial clamping surfaces on both the outer teeth and the yoke of a lamination packet.

The above-described measures for the stator core 20 or lamination packet 40 apply not only to lamination packets 40 that are smooth or slightly uneven on the outer circumference of the round lamination packet 40 or lamination packets 40 that diverge slightly from the cylindrical shape, but also to lamination packets 40 that are provided with teeth on their outer circumferences, see FIGS. 15*a* and 15*b*. Both FIG. 15*a* and FIG. 15*b* show a rolled lamination packet 40 with a yoke 26 and the teeth 24 as well as the grooves 42. So-called outer teeth 70 are provided on the outer circumference of the lamination packet 40, i.e. oriented away from the teeth 24. As in the previously described exemplary embodiments, here, too, the lamination packet 40 in the annular state is plastically deformed in the axial direction at least in parts of the axial end surfaces 46. In the exemplary embodiment shown in FIG. 15*a*, the parts of the axial end surfaces 46 that are plastically deformed are constituted by the outer teeth 70. This means that the plastically deformed axial end surface 53 is located only on the outer teeth 70. Also in this instance, the housing fitting 54 is produced exclusively on the outer teeth 70. This means that the outer teeth 70 are pressed and thus plastically deformed in the radial direction toward the yoke 26. The previously mentioned insertion chamfer 55 can naturally also be produced in an exemplary embodiment according to FIG. 15*a*.

In FIG. 15*b*, the axial clamping surface 53 is produced not only on outer teeth 70, but is also situated partially in the region of the yoke 26 so that the plastic deformation in the axial direction is produced not only on the outer teeth 70, but also on the yoke 26, over a narrow region of its outer circumference in this instance. As in the exemplary embodiment according to FIG. 15*a*, here, too, the outer teeth 70 are each provided with a housing fitting 54.

It has already been mentioned that the axial rigidity of each lamination packet 40 can also be increased my means of intentionally placed welding seams on the lamination packet 40. A few exemplary embodiments of this will be explained below.

Figure 16:
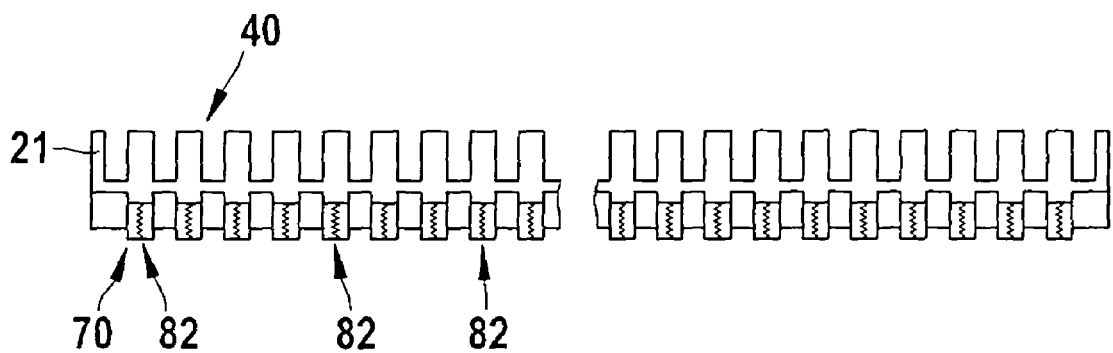

In addition to that which has been mentioned and described above for an initially flat lamination packet 40, various welding seams and welding seam combinations are possible:

In a first welding seam combination, the lamellas 21 that are packeted with one another are welded to one another at the position of each outer tooth 70 over the entire axial width of a lamination packet 40 by means of an outer tooth welding seam 82, FIG. 16.

Figure 17:
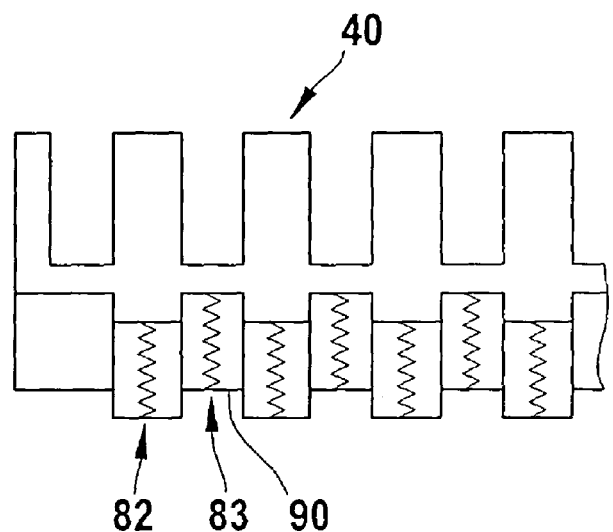

In a second welding seam combination, the outer grooves 72 are also welded to one another over the entire axial width of the lamination packet 40, FIG. 17.

Figure 18:
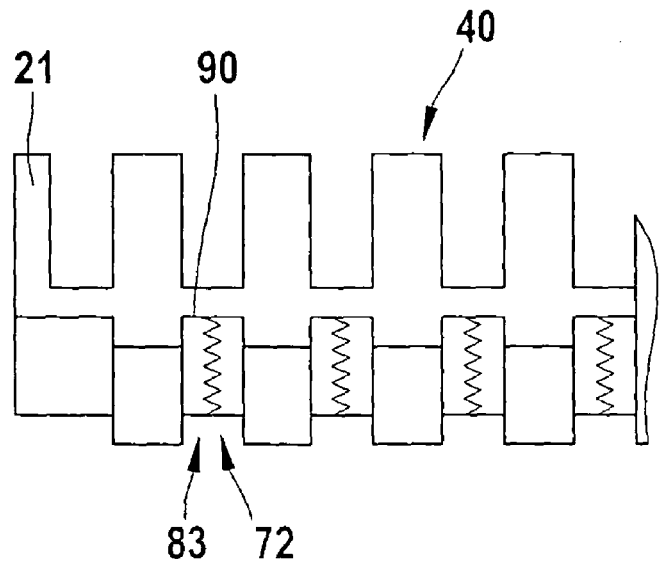

In a third welding seam combination, only the outer grooves 72 are welded to one another in the groove bottom 90 over the entire axial width of the lamination packet 40, FIG. 18.

Figures 19A, 19B:
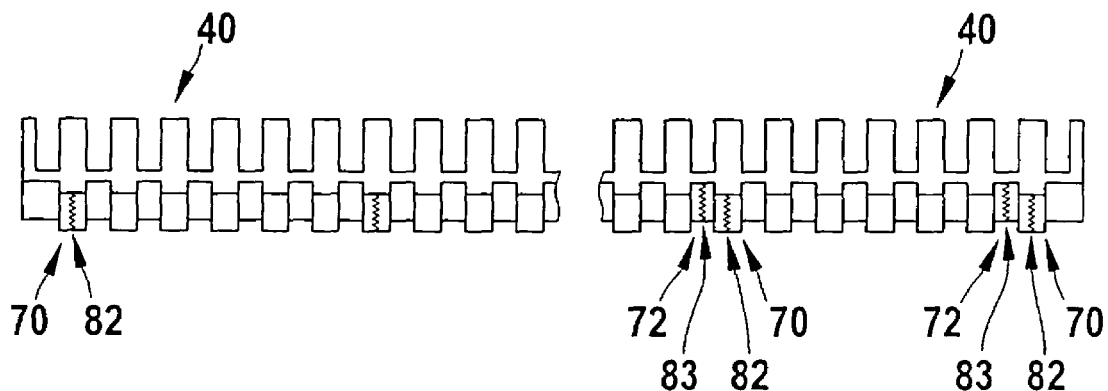

In a fourth welding seam combination, only a fraction of the outer teeth 70 and outer grooves 72, primarily every sixth outer tooth 70 and/or every sixth outer groove 72, are welded to one another over the entire axial width of the lamination packet 40, FIGS. 19*a* and 19*b*.

Figures 20A, 20B:
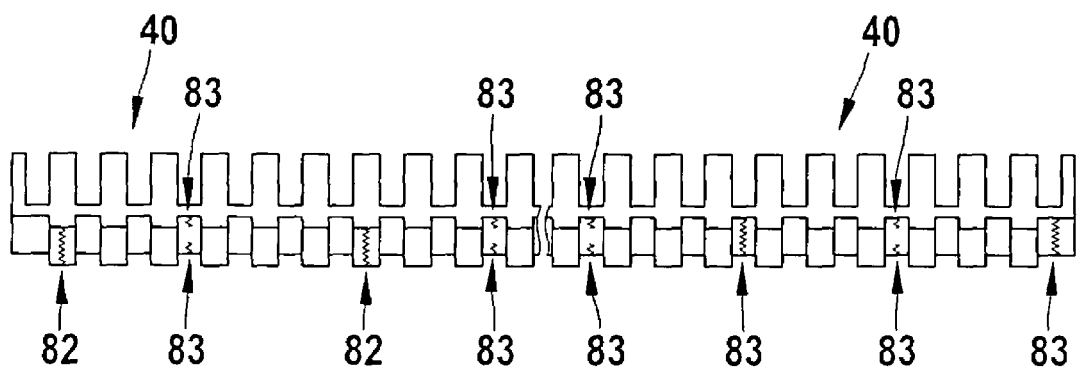

In a fifth welding seam combination, between individual welding seams that connect all of the lamellas 21, additional welding seams are provided, particularly embodied in the form of outer groove welding seams 83, which start from one axial end surface 46, extend in the axial direction, and only connect up to 20 lamellas 21 to one another, FIGS. 20*a* and 20*b*. These short, additional welding seams 83 start from both axial end surfaces 46 of the lamination packet 40. In a particularly preferable combination, on the one hand, a groove bottom welding seam 81 is provided in every sixth groove 42 and connects all of the lamellas 21 over the axial width of the lamination packet 40, for example starting in a first groove, then in a seventh groove, and so on, ending with the 36th or 48th groove and, on the other hand, between these welding seams in the grooves 42, short additional welding seams 83 start from both axial end surfaces 46 of the lamination packet 40. It is preferable for these to be situated centrally between the continuous welding seams 81, also see FIGS. 21*a* and 21*b*.

Whereas in lamination packets 40 with lamellas 21 that have a material thickness of 1.0 mm, it is not necessary to provide additional short welding seams 83 for reinforcing purposes, it has turned out that in lamination packets 40 composed of lamellas 21 that have a material thickness of 0.65 mm, at least three lamellas 21 must be attached to one another. With lamellas 21 that have a material thickness of 0.5 mm, at least four laminations must be attached to one another, while with a material thickness of 0.35, at least six lamellas 21 must be attached to one another.

In a sixth welding seam combination, tooth head welding seams 80 are provided on the tooth heads 29 of the teeth 24 and connect the lamellas 21 to one another over the entire axial width of the lamination packet 40, FIG. 22. The tooth head welding seams 80 are preferably situated in the middle of the teeth, viewed in the circumference direction.

Figure 23:
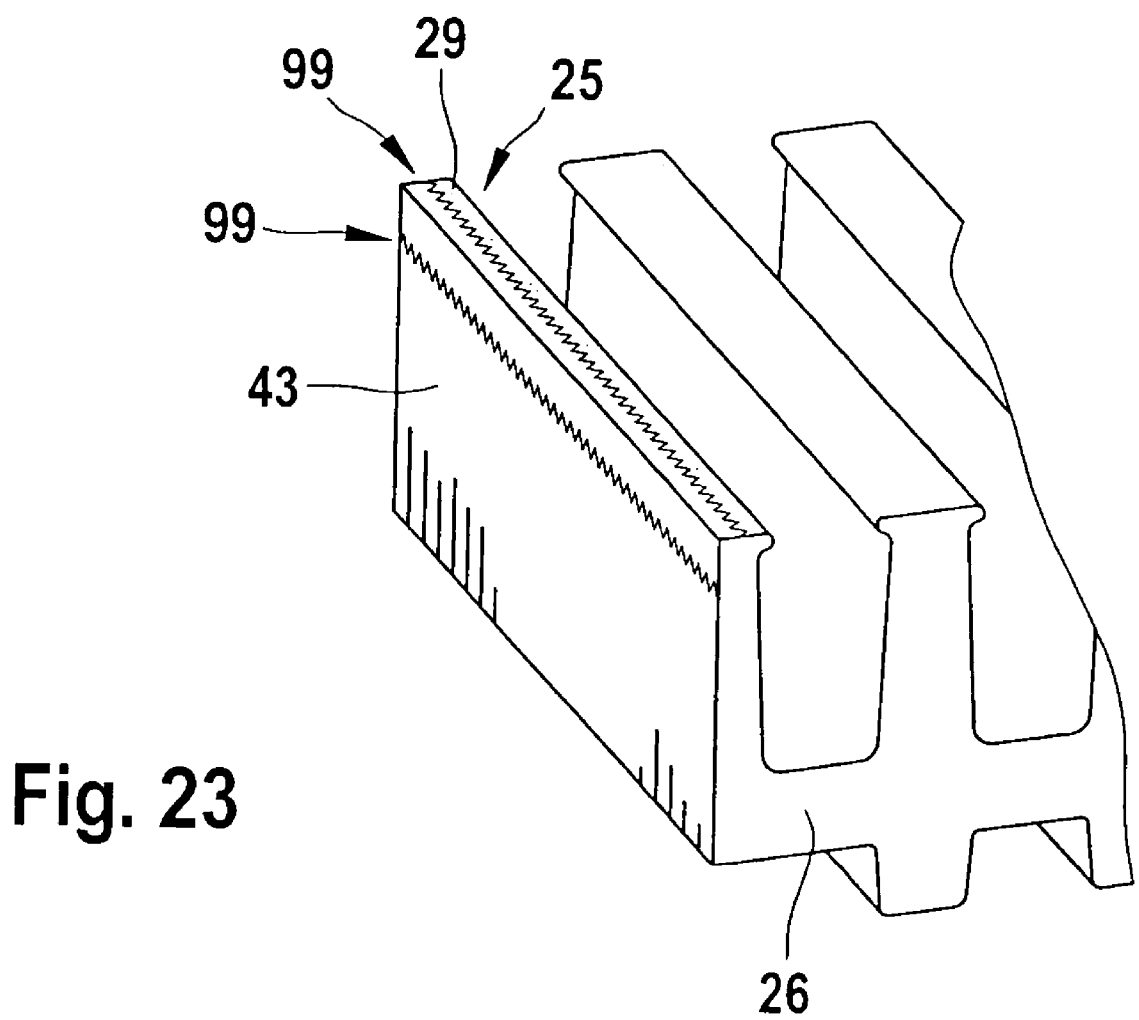

In a seventh welding seam combination, the half teeth 25 are attached to one another over the entire axial width of a lamination packet 40 by means of half tooth welding seams 99, FIG. 23. These half tooth welding seams 99 are provided on the ends 43 and/or on the tooth heads 29 of the half teeth 25. The half tooth welding seams 99 on the ends 43 are preferably situated in the half of the half tooth 25 oriented away from the yoke 26.

The stator according to the present invention could be described, for example, as a stator for an electric machine, in particular for a generator for motor vehicles, which has a stator yoke that is comprised of rolled strip-shaped lamellas 21 and has axial end surfaces 46, the stator yoke being plastically deformed in the axial direction on its end surfaces 46.

It is also possible to formulate a different description of the stator according to the present invention, according to which a stator for an electric machine, in particular a generator for motor vehicles, has a stator yoke that is comprised of rolled strip-shaped lamellas 21 and has axial end surfaces 46, the stator yoke having an axial length at its inner diameter that is greater than at its outer diameter. The differing axial lengths are due to a shaping process that plastically deforms the lamellas 21.

All contours shown in the figures accompanying this specification are merely depicted symbolically.

What is claimed is:

1. A method for manufacturing a stator core (20) for an electric machine, in which a plurality of strip-shaped lamellas (21) with outer teeth (70) are first stacked to form an essentially block-shaped lamination packet (40) that is then shaped into an annular form by means of roller bending in one of the subsequent steps so that the outer teeth are provided on the outer circumference of the lamination packet and has an axial direction (a) that corresponds to a cylinder axis (z), the annular form having axial end surfaces (46), wherein in another of the subsequent steps, the annular lamination packet (40) is plastically deformed in the axial direction (a) only on the outer teeth (70) of the axial end surfaces (46).

2. The method as recited in claim 1, wherein axial clamping surfaces (53) are formed onto the two axial ends of the annular lamination packet (40) as a result of the plastic deformation of the end surfaces (46).

3. The method as recited in claim 1, wherein at the same time, the outer circumference of the annular lamination packet (40) is pressed in the radial direction and thus plastically deformed.

4. The method as recited in claim 3, wherein the plastic deformation of the outer circumference of the lamination packet (40) produces a radial housing fitting (54).

5. The method as recited in claim 1, wherein the plastic deformation simultaneously forms an insertion chamfer (55).

6. The method as recited in claim 1, wherein the lamellas (21) have a thickness between 0.35 mm and 1 mm.

7. The method as recited in claim 1, wherein a number of n lamellas of a lamination packet (40) are positioned in the packet in the same sequence in which they were produced in a stamping die.

8. The method as recited in claim 7, wherein the lamination packet (40) is divided into at least two partial lamination packets (58) and these are joined to form a lamination packet (40) so that at an internal junction point (65), stamping burrs (57) of adjacent lamellas (21) are oriented away from each other.

9. The method as recited in claim 7, wherein the still individual lamellas (21) are first cleaned and then the desired number of lamellas (21) are stacked to produce a gap-free lamination packet (40), precisely aligned, pressed against one another through exertion of a force, and then the lamellas (21) are attached to one another by means of an attaching technique.

10. The method as recited in claim 1, wherein before the lamellas (21) are stamped out from a lamination sheet blank, its material thickness (s) is determined by means of a measuring device (M) and the desired number of lamellas in the essentially block-shaped lamination packet (40) is determined based on a toleranced desired width of the essentially block-shaped lamination packet (40).

11. The method as recited in claim 1, wherein outwardly oriented stamping burrs (57) of the lamellas (21) are removed.

12. The method as recited in claim 1, wherein the roller bending occurs while the lamination packet (40) is axially prestressed at the same time.

13. The method as recited in claim 1, wherein the essentially block-shaped lamination packet (40) has two ends 43, which are attached to each other after the lamination packet (40) undergoes roller bending while being axially prestressed.

14. The method as recited in claim 1, wherein the axial shaping step reduces the axial length of the stator packet (40) by between 1% and 10% at the outer circumference.

15. The method as recited in claim 1, wherein half tooth welding seams (99) are provided on tooth heads (29) of half teeth (25) and/or on the end surfaces (43) of the half teeth (25).

16. The method as recited in claim 1, wherein welding seams (81, 83) are provided, which extend in the axial direction from an axial end surface (46) and only connect up to twenty lamellas (21) to one another.

17. The method as recited in claim 1, wherein before the roller bending, a stator winding (60) is inserted into the essentially block-shaped lamination packet.

18. The method as recited in claim 1, wherein the lamellas (21) have a thickness of 0.5 mm.

19. The method as recited in claim 1, wherein the lamellas (21) have the same material thicknesses.

\* \* \* \* \*